(12) United States Patent
Stegge

(10) Patent No.: US 6,830,684 B2
(45) Date of Patent: Dec. 14, 2004

(54) INTEGRATED LIQUID AND GAS DISTRIBUTION DEVICE FOR UNDERDRAIN BLOCK LATERALS

(75) Inventor: Jerry Stegge, Ames, IA (US)

(73) Assignee: U.S. Filter Corporation, Warrendale, PA (US)

(*) Notice: Subject to any disclaimer, the term of this patent is extended or adjusted under 35 U.S.C. 154(b) by 55 days.

(21) Appl. No.: 10/192,627

(22) Filed: Jul. 10, 2002

(65) Prior Publication Data

US 2004/0007541 A1 Jan. 15, 2004

(51) Int. Cl.[7] .............................................. B01D 24/46
(52) U.S. Cl. .................. 210/274; 210/275; 210/289; 210/293; 210/291; 210/150; 210/617; 210/618
(58) Field of Search ................................ 210/274, 275, 210/293, 289, 291, 150, 617, 618

(56) References Cited

U.S. PATENT DOCUMENTS

| | | |
|---|---|---|
| 2,710,692 A | 6/1955 | Kegel et al. |
| 2,716,490 A | 8/1955 | Barstow |
| 4,065,391 A | 12/1977 | Farabaugh |
| 4,133,766 A | 1/1979 | Adie |
| 4,214,992 A | 7/1980 | Sasano et al. |
| 4,222,876 A | 9/1980 | Englehart |
| 4,331,542 A | 5/1982 | Emrie |
| 4,364,830 A | 12/1982 | Roberts |
| 4,564,450 A | 1/1986 | Piper et al. |
| 4,619,765 A | 10/1986 | Roberts |
| 4,750,999 A | 6/1988 | Roberts et al. |
| 4,882,053 A | 11/1989 | Ferri |
| 5,019,259 A | 5/1991 | Hambley |
| 5,068,034 A | 11/1991 | Walter |
| 5,087,362 A | 2/1992 | Brown |
| 5,089,147 A | 2/1992 | Ross |
| 5,108,627 A | 4/1992 | Berkebile et al. |
| 5,149,427 A | 9/1992 | Brown et al. |
| 5,156,738 A * | 10/1992 | Maxson ...................... 210/274 |
| 5,160,614 A | 11/1992 | Brown |
| 5,202,022 A | 4/1993 | Ferri |
| 5,232,592 A | 8/1993 | Brown et al. |
| 5,269,920 A | 12/1993 | Brown et al. |
| 5,328,608 A | 7/1994 | Bergmann et al. |
| 5,332,497 A | 7/1994 | Shea et al. |
| 5,413,710 A | 5/1995 | Roberts et al. |
| 5,464,543 A * | 11/1995 | Moore ......................... 210/794 |
| 5,489,388 A | 2/1996 | Brown et al. |
| 5,534,202 A | 7/1996 | Roberts et al. |
| 5,618,421 A | 4/1997 | Sorosinski |
| 5,639,384 A | 6/1997 | Brown et al. |
| 5,865,999 A | 2/1999 | Shea et al. |
| 6,090,284 A * | 7/2000 | Melber et al. .............. 210/274 |
| 6,190,568 B1 * | 2/2001 | Hunkele ...................... 210/767 |
| 6,306,221 B1 * | 10/2001 | Magliocca ................... 134/10 |
| 6,423,216 B1 * | 7/2002 | Yum et al. .................. 210/150 |
| 6,569,328 B1 * | 5/2003 | Haggard ...................... 210/275 |

FOREIGN PATENT DOCUMENTS

| | | |
|---|---|---|
| WO | WO 97/40907 | 11/1997 |
| WO | WO 98/04332 | 2/1998 |

OTHER PUBLICATIONS

Triton Underdrain documentation, including drawings (4 pages) and brochure information (1 page). Product sold publicly prior to Jul. 1, 2001.

* cited by examiner

Primary Examiner—Blaine Copenheaver
Assistant Examiner—Minh-Chau T. Pham

(57) ABSTRACT

The invention recites a filter comprising a block including an outer wall defining an inner chamber and a block exterior, and a conduit having a conduit wall, a first conduit end, a second conduit end, and an inner flow path providing fluid communication between the first and second conduit ends. The conduit wall includes an orifice therethrough. The conduit is coupled to the block such that the first conduit end is in fluid communication with the inner chamber of the block and the second conduit end and the orifice are in fluid communication with the block exterior.

20 Claims, 4 Drawing Sheets

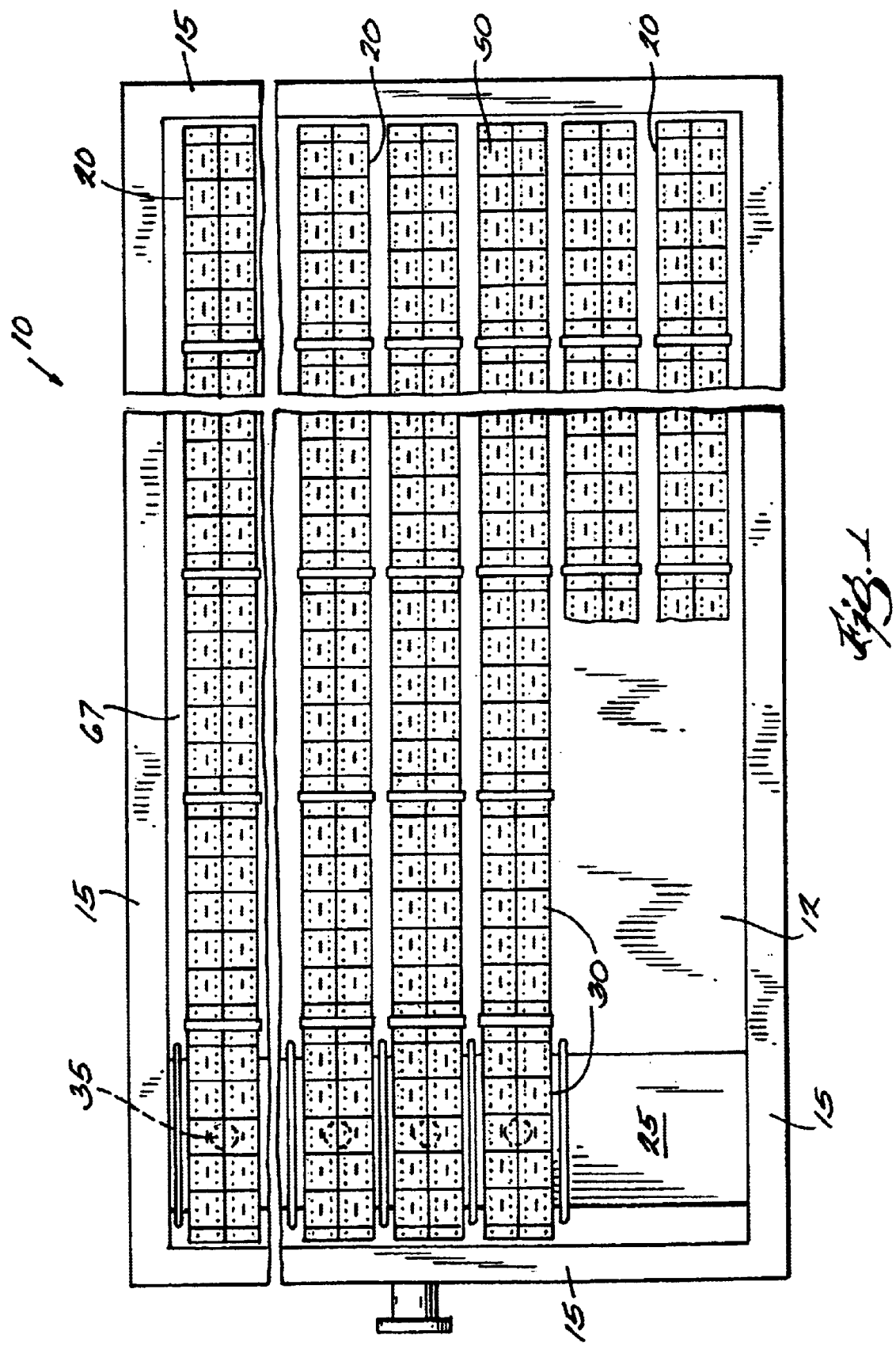

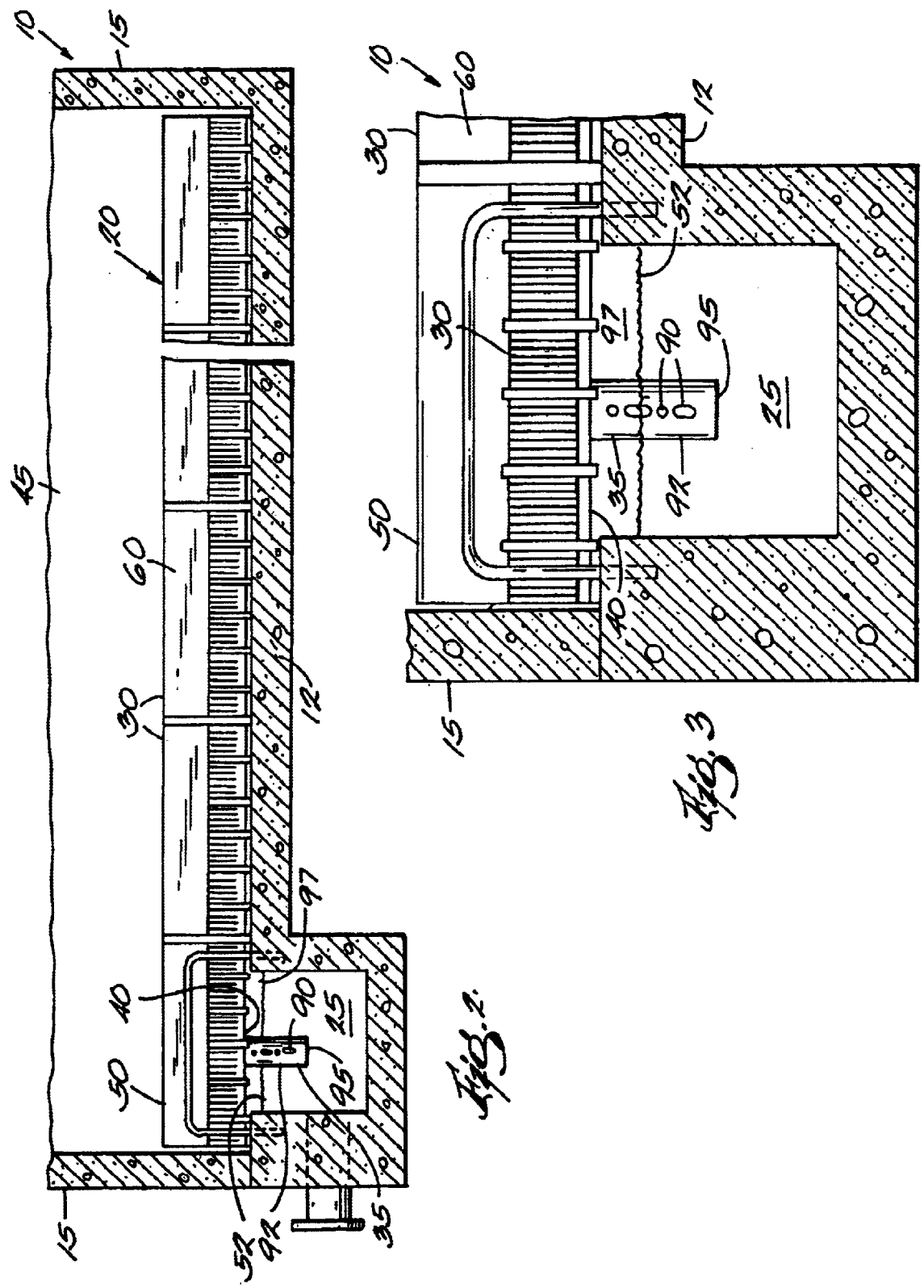

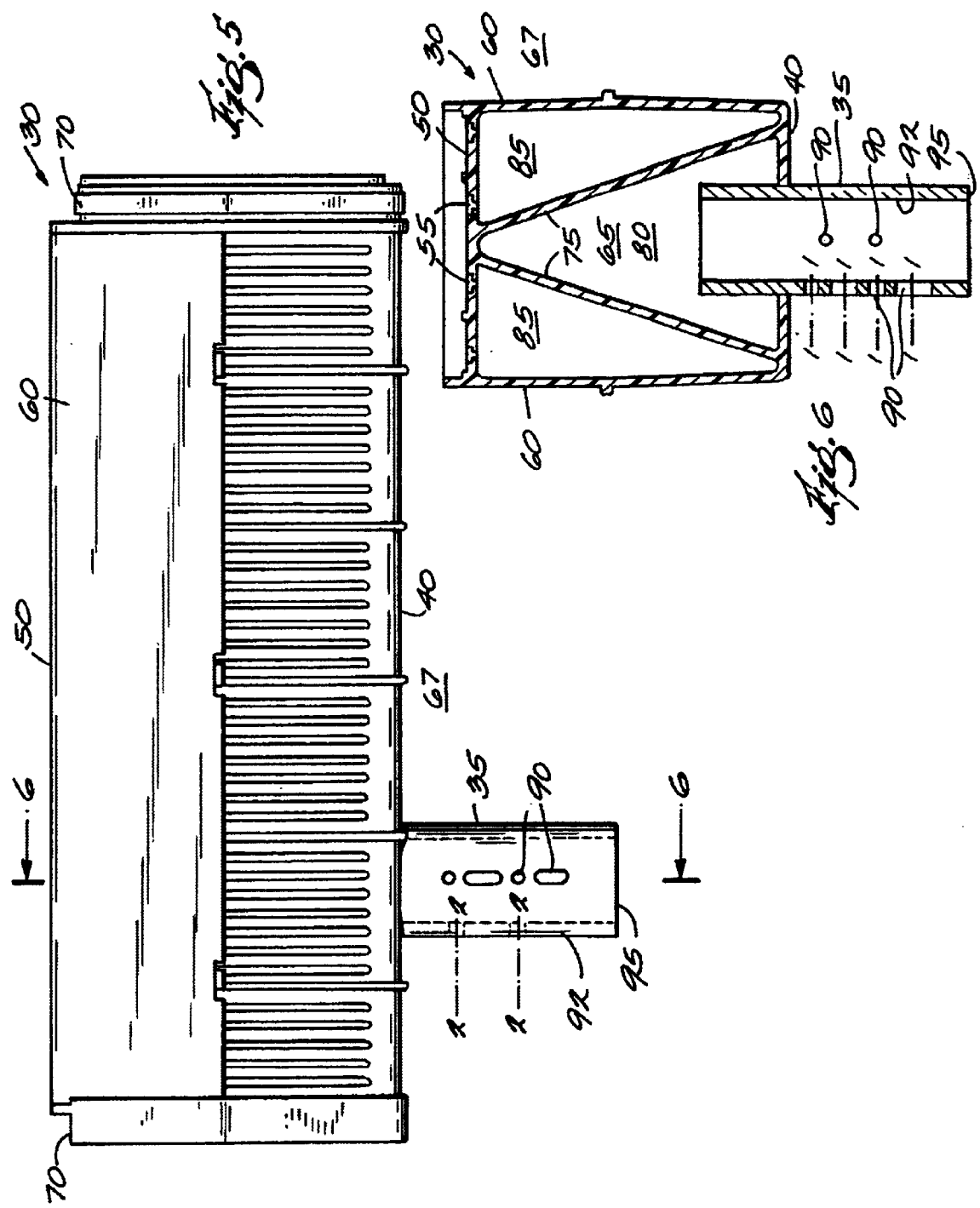

INTEGRATED LIQUID AND GAS DISTRIBUTION DEVICE FOR UNDERDRAIN BLOCK LATERALS

BACKGROUND AND SUMMARY OF THE INVENTION

The present invention relates to gravity filters, and particularly to gravity filters using multiple underdrain blocks to define laterals. More particularly, the present invention relates to gravity filters having multiple underdrain block laterals that employ a backwash cycle for cleaning.

Gravity filters, used to filter water or other influents, commonly use underdrain blocks to support a filter media, and provide convenient flow paths into and out of the filter media. The underdrain blocks are arranged in rows commonly called laterals. The laterals are arranged side-by-side to cover the bottom of the filter. Water enters the gravity filter, flows through the filter media and into the underdrain block laterals. The filtered water, or filtrate, flows along the underdrain laterals to an outlet. To facilitate removal of the filtrate, gravity filters commonly employ a flume disposed perpendicular to and beneath the underdrain laterals. An opening in each underdrain lateral connects the lateral to the flume, which carries the filtrate out of the filter.

Periodically, gravity filters require a backwash cycle to clean the filter media and improve the filter effectiveness. During a backwash cycle, a backwash liquid, commonly water, flows into the individual laterals and into the filter media. The fluid passes through the laterals and the filter media in substantially the opposite direction as the influent flow. The backwash liquid removes contaminates and other debris that clogs the filter media.

To improve the effectiveness of the backwash cycles, it is common to introduce a gas, typically air, with the backwash liquid flow. Air and water are used in conjunction or individually to perform the periodic backwash cycles.

Introducing air into the underdrain laterals currently requires the use of a separate air supply header within the flume with risers or drop tubes feeding the individual underdrain laterals. The air supply header, risers, and drop tubes disrupt flow within the flume and filter by taking up flow space. Therefore, it is desirable to provide an apparatus that allows for the introduction of both liquid and gas for backwashing of the filter media without requiring an additional, separate header or complicated wall penetrations.

Thus, according to the present invention, a filter provides a cuboidal block including an outer wall defining an inner chamber and a block exterior. A typical cuboidal block is defined by the extrusion of a square or rectangular cross section along an axis. The filter also includes a conduit having a conduit wall, a first conduit end, a second conduit end, and an inner flow path providing fluid communication between the first and second conduit ends. The conduit wall includes an orifice therethrough. The conduit is coupled to the block such that the first conduit end is in fluid communication with the inner chamber of the block and the second conduit end and the orifice are in fluid communication with the block exterior.

The invention further provides a method of backwashing a filter. The filter includes a cuboidal block having an inner chamber and a block exterior. The conduit also includes a first end in fluid communication with the inner chamber of the block and a second end in fluid communication with the first end. The wall of the conduit has an orifice therethrough, the orifice and second end disposed in the block exterior. The method comprises disposing the second end of the conduit in a reservoir. The method further includes providing a backwash liquid to the reservoir and providing a backwash gas to the reservoir. The air and gas supply is pressurized such that the liquid supply enters the second end of the conduit and the gas selectively enters the conduit through the orifice. The liquid and gas pass through the conduit and into the block.

In preferred embodiments, the blocks interconnect to define laterals. A filter having a base supports the laterals in a side-by-side relationship with the laterals substantially covering the base. A flume formed in the base of the filter extends beneath each lateral. The conduit, which is preferably a round pipe, extends into the flume such that one end of the conduit and the conduit orifices are disposed within the flume.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a top view of a filter in accordance with the present invention, including a series of underdrain blocks;

FIG. 2 is a side view of the filter of FIG. 1;

FIG. 3 is a close-up side view of the collection/distribution flume region of the filter of FIG. 1 during a backwash cycle;

FIG. 5 is a side view of the underdrain block of FIG. 4; and

FIG. 6 is a cross sectional view of the underdrain block of FIG. 5 taken along line 6-6.

DETAILED DESCRIPTION OF THE DRAWINGS

Figure 4:
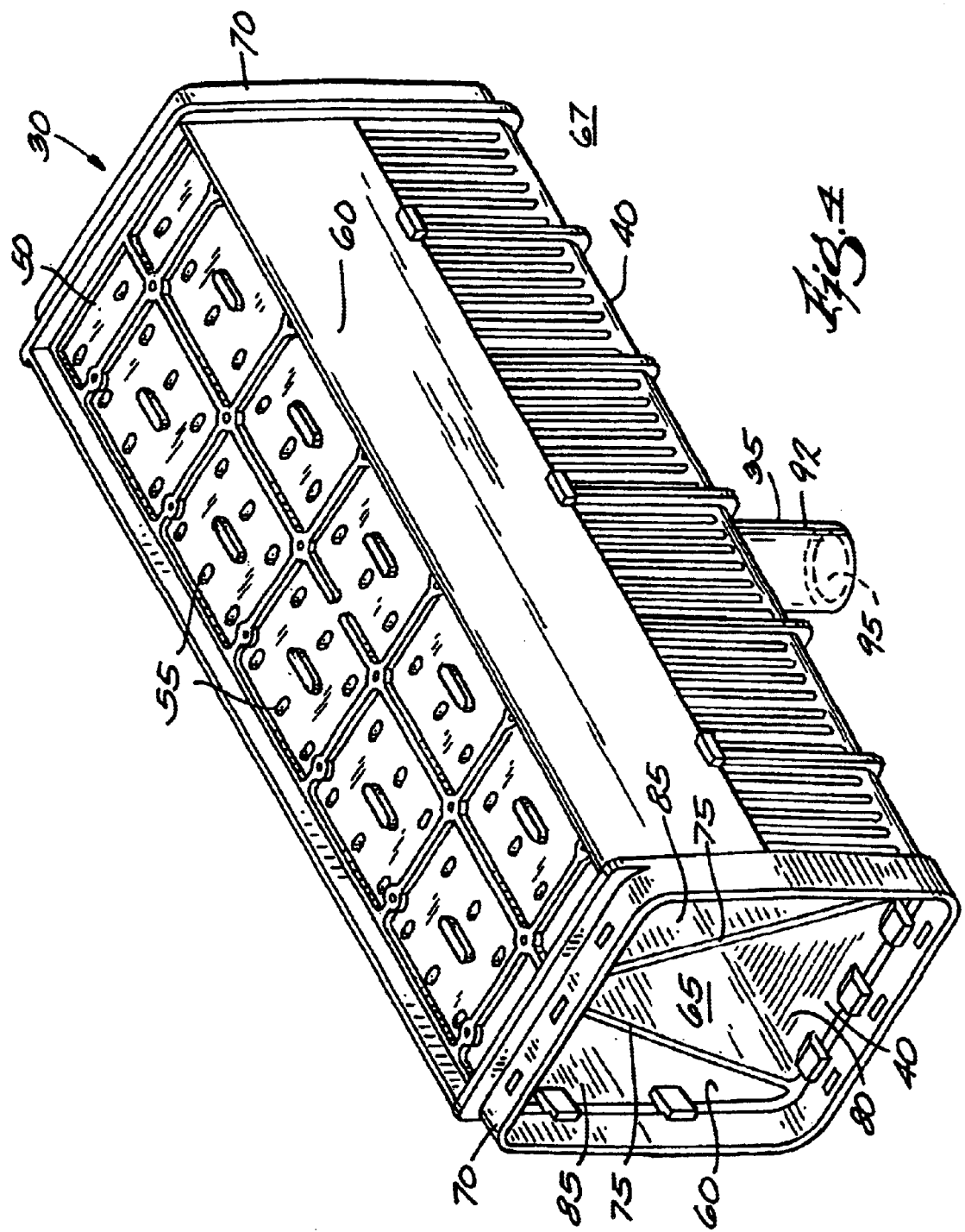
FIG. 4 is a perspective view of one of the underdrain blocks of the filter of FIG. 1.

FIG. 1 shows a top view of a filter 10 having a base 12 and four walls 15. A plurality of underdrain laterals 20 are arranged side-by-side to substantially cover the base 12. A collection/distribution flume 25 disposed beneath the underdrain laterals 20 provides for the collection of filtrate after it passes through the filter 10 and the distribution of backwash fluid during a backwash cycle. While FIGS. 1 and 2 illustrate a rectangular filter 10, it will be apparent to those of ordinary skill in the art that the actual shape of the filter 10 is not critical to the function of the invention.

FIG. 2 is a section view of the filter of FIG. 1 showing the base 12 and walls 15 of the filter 10, the collection/distribution flume 25, an underdrain lateral 20 made up of a plurality of cuboidal underdrain blocks 30, and a conduit 35. The conduit 35 extends from the bottom 40 of one of the underdrain blocks 30 of the lateral 20 into the collection/distribution flume 25. During filtering, influent passes through the filter media 45 disposed on top of the underdrain laterals 20. The now filtered influent, referred to herein as filtrate, enters one of the plurality of underdrain laterals 20 through the top surface 50 of an underdrain block 30. The underdrain laterals 20 channel the filtrate toward the collection/distribution flume 25 and the conduit 35 disposed therein. The filtrate enters the conduit 35 within the underdrain lateral 20 and flows into the collection/distribution flume 25 where it is removed from the filter 10.

During a backwash cycle, this process reverses. A backwash fluid 52 (shown as a liquid in FIGS. 2 and 3) enters the collection/distribution flume 25 and is forced into the conduit 35. The fluid enters the underdrain laterals 20, flows out the tops 50 of the individual underdrain blocks 30 and up through the filter media 45. The backwash cycle will be discussed in more detail below with regard to FIG. 3.

FIGS. 4–6 show an underdrain block 30 having a plurality of top openings 55, a plurality of walls 60 that define an inner chamber 65 and an outer region 67, ends 70 adapted for interconnection with one another, and the conduit 35 protruding through the bottom surface 40. The underdrain block 30 also includes a pair of angled walls 75, shown best in FIG. 4, extending almost the full length of the underdrain block 30. The angled walls 75 separate the inner chamber 65 into a primary chamber 80, and two secondary chambers 85. Openings (not shown) between the primary chamber 80 and secondary chambers 85 allow for the interchange of fluid therebetween. Other embodiments of underdrain blocks (not shown) may include several internal walls defining several chambers or no internal walls leaving only a single chamber.

Only one conduit 35 is illustrated and described as entering each underdrain lateral 20. It should be noted that the invention should not be limited to constructions in which only one conduit 35 enters any given underdrain block 30 or underdrain lateral 20.

FIGS. 5 and 6 show the conduit 35 extending into the primary chamber 80 of the underdrain block 30. In the construction of FIG. 6, the conduit 35 extends well into the primary chamber 80. In other constructions, the conduit extends into the conduit 35 only enough to position the end of the conduit 35 flush with the inside of the bottom surface 40. The conduit 35 can be positioned at any elevation desired within the block 30. In still other constructions, the conduit 35 extends into a chamber other than the primary chamber 80. For example, the conduit 35 could extend into one of the secondary chambers 85 rather than the primary chamber 80 as illustrated in FIG. 6.

The conduit 35 of FIGS. 5 and 6 is essentially a round pipe with one or more orifices 90 extending through its wall 92. While a round pipe is the preferred shape, other embodiments use other shapes. For example, the conduit could be square, oval, octagonal, etc. Any shape conduit will function with the present invention, so long as it provides a sufficiently sized flow path for the filtrate and the backwash fluids.

FIGS. 5 and 6 illustrate the conduit 35 having multiple orifices 90 on two sides of the conduit 35. The placement, quantity, and size of the orifices 90 can vary. For example, the embodiment of FIG. 5 illustrates a conduit 35 having four orifices 90, two circular and two slotted, on one side of the conduit 35. The orifices 90 define radial axes 1—1 (shown in FIG. 6) that are parallel to each other. The orifice radial axes 1—1 extend along a radial line defined by the conduit 35 through the conduit wall 92.

FIG. 6 illustrates the conduit 35 and underdrain block 30 rotated ninety degrees. The orifices 90 of FIG. 6 are circular rather than a combination of circular and slotted. The orifices 90 of FIG. 6 define radial axes 2—2 (shown in FIG. 5) that are perpendicular to the axes 1—1. Other embodiments may use a single orifice 90 on only one side of the conduit 35 or a single orifice on multiple sides of the conduit. Still other embodiments may use multiple orifices 90 on multiple sides of the conduit 35. As one skilled in the art will realize, orifices 90 of any shape and size and at any angle to one another are possible and contemplated by the invention.

FIG. 3 illustrates a magnified view of the collection/distribution flume 25 that allows for a more detailed explanation of the backwash cycle. During backwash, a pressurized supply of backwash fluid such as air, water, or both is introduced into the collection/distribution flume 25 for further distribution into the underdrain laterals 20. While air and water are the most common backwash fluids used, other fluids including carbon dioxide, nitrogen, filtrate and the like, will function in a manner similar to that of air or water. Therefore, the terms air and water will be used herein to describe the backwash cycle, however, it should be understood that other fluids may be substituted for air and water and thus the terms should not be read as limiting the use of the invention to air and water alone.

During a backwash cycle in which only water is used, water fills the collection/distribution flume 25 and passes through the bottom conduit opening 95 to enter the underdrain laterals 20. Water also passes through the orifices 90 in the conduit wall to enter the underdrain laterals 20. Likewise, when air alone is used, the air is free to enter the underdrain laterals 20 through the bottom conduit opening 95 as well as the orifices 90 within the conduit wall 92.

However, when both air and water are used, the orifices 90 act as a metering device controlling the amount of water and air that enters the underdrain blocks 30. Air enters the collection/distribution flume 25 through a dedicated air supply pipe. Alternatively, air is introduced into the backwash water flow before it enters the collection/distribution flume 25. Backwash water flows into the collection/distribution flume 25 through a backwash feed pipe. The air rises to the top of the collection/distribution flume 25 where it is trapped between the underdrain laterals 30 and the backwash water. The air thus forms an air blanket 97 above the backwash water 52. Water freely flows into the conduit 35 through the bottom opening 95, which is generally submerged, and the orifices 90 in the conduit 35 that are submerged. As the thickness of the air blanket 97 increases (i.e., more air is introduced into the flume 25), the backwash water level decreases. The reduced water level exposes the uppermost orifices 90 to the air blanket 97, and allows air to flow into the underdrain laterals 20. The orifices 90 are small enough to provide sufficient air head loss to allow the collection/distribution flume 25 to act as a header providing sufficient air to all of the underdrain laterals 20. As the water level drops further, more orifices 90 (or more orifice area) is exposed to the air blanket 97, thereby increasing the amount of air that enters the underdrain laterals 20. Initially, the water level is high enough to cover all of the orifices 90 in the protruding conduits 35, thereby forcing water alone to enter the underdrain laterals 20. As the volume of air supplied continues to rise, the air blanket 97 thickens and the water level within the collection/distribution flume 25 drops, thereby exposing a portion of the conduit orifice 90 to the air blanket 97. Air enters the exposed portion of the orifice 90, while water continues to enter through the bottom opening 95 of the conduit 35. Eventually, the flow rate of air into the collection/distribution flume 25 equals the flow rate of air through the conduit orifices 90 and the system stabilizes. If however, the air supply exceeds the passing capability of the orifices 90, the water level will drop below the bottom conduit opening 95, and only air will flow into the underdrain laterals 20. The orifices 90 can be positioned and sized to pass any volume of air desired.

Although the invention has been described in detail with reference to certain preferred embodiments, variations and modifications exist within the scope and spirit of the invention as described and defined in the following claims.

What is claimed is:

1. A filter comprising:
    a cuboidal block including an outer wall defining an inner chamber and a block exterior; and
    a conduit having a conduit wall, a first conduit end, a second conduit end, and an inner flow path providing fluid communication between the first and second conduit ends, the conduit wall having an orifice therethrough, the conduit coupled to the block such that the first conduit end is in fluid communication with the inner chamber of the block and the second conduit end and the orifice are in fluid communication with the block exterior,
    wherein the orifice is sized and positioned relative to the second conduit end to allow the simultaneous admission of a gas and a liquid during a backwash operation.

2. The filter of claim 1, wherein the block further comprises a top and a bottom, the bottom defining an opening therethrough, and wherein the conduit is disposed within the bottom opening.

3. The filter of claim 1, wherein the orifice is circular.

4. The filter of claim 1, wherein the conduit defines an axis extending from the first end to the second end, and wherein the orifice is a slot having a long axis parallel to the axis of the conduit.

5. The filter of claim 1, wherein the orifice further comprises a plurality of orifices.

6. The filter of claim 5, wherein each orifice extends through the conduit wall along a radial axis, and wherein the radial axes defined by the orifices are disposed at more than one angle relative to one another.

7. The filter of claim 1, further comprising a flume having an open surface, and wherein a plurality of blocks interconnect to define a plurality of laterals, the laterals disposed above and substantially covering the open surface of the flume.

8. The filter of claim 7, wherein the second end of the conduit and the conduit aperture are disposed substantially within the flume.

9. The filter of claim 8, wherein the conduit is a pipe.

10. A filter comprising:
    a plurality of cuboidal blocks interconnected to define a plurality of laterals, each block having an outer wall defining an inner chamber and a block exterior;
    a filter including a base and a wall, the base supporting the plurality of laterals and including a flume having an open surface, the flume disposed beneath the laterals; and
    a plurality of conduits, each having a first end, a second end, a wall defining an inner flow path providing fluid communication between the first end and the second end, and an orifice passing through the conduit wall providing fluid communication between the block exterior and the inner flow path, each of the plurality of conduits coupled to one of the plurality of laterals such that the first end of the conduit is in fluid communication with the inner chamber of the block and the second end of the conduit and the conduit orifice are in fluid communication with the flume,
    wherein the flume contains a liquid and a gas during a portion of a backwash cycle and wherein the second ends of the conduits are disposed substantially within the liquid and the orifices are substantially disposed within the gas such that water and gas are simultaneously admitted into the inner chamber during the portion of the backwash cycle.

11. The filter of claim 10, wherein a portion of each lateral at least partially covers the open surface of the flume, and the plurality of laterals together substantially cover the open surface of the flume.

12. The filter of claim 10, wherein the orifice is circular.

13. The filter of claim 10, wherein the conduit defines an axis extending from the first end to the second end, and wherein the orifice is a slot having a long axis parallel to the axis of the conduit.

14. The filter of claim 10, wherein the orifice further comprises a plurality of orifices.

15. The filter of claim 14, wherein each orifice extends through the conduit wall along a radial axis, and wherein the radial axes defined by the orifices are disposed at more than one angle relative to one another.

16. The filter of claim 10, wherein the conduit is a pipe.

17. The filter of claim 10, wherein one of the plurality of blocks defining each lateral further comprises a top and a bottom, the bottom defining an opening therethrough, and wherein one of the plurality of conduits is disposed within each opening.

18. The filter of claim 10, wherein each of the conduits has a round cross section.

19. A method of backwashing a filter, the filter including a cuboidal block defining an inner chamber and a block exterior, a conduit having a first end in fluid communication with the inner chamber of the block and a second end in fluid communication with the first end, the conduit having an aperture therethrough, the aperture and second end disposed in the block exterior, the method comprising:
    disposing the second end of the conduit in a reservoir;
    providing a backwash liquid to the reservoir;
    providing a backwash gas to the reservoir; and
    pressurizing the gas and liquid supply such that the liquid supply enters the second end of the conduit and the gas selectively enters the conduit through the aperture, the liquid and gas passing through the conduit and into the block simultaneously during a substantial portion of the backwash.

20. The method of claim 19, wherein the gas is air and the liquid is water.

* * * * *

UNITED STATES PATENT AND TRADEMARK OFFICE
CERTIFICATE OF CORRECTION

PATENT NO. : 6,830,684 B2
DATED : December 14, 2004
INVENTOR(S) : Jerry Stegge

It is certified that error appears in the above-identified patent and that said Letters Patent is hereby corrected as shown below:

Title page,
Item [73], replace "Assignee: U.S. Filter Corporation, Warrendale, PA (US)" with
-- Assignee: USFilter Corporation, Warrendale, PA (US) --.

Signed and Sealed this

Seventeenth Day of May, 2005

JON W. DUDAS
*Director of the United States Patent and Trademark Office*